(12) United States Patent
Lin et al.

(10) Patent No.: US 8,383,938 B2
(45) Date of Patent: Feb. 26, 2013

(54) SLIDING COVER FACEPLATE AND ELECTRONIC DEVICE USING THE SAME

(75) Inventors: Chin-Lai Lin, Taipei (TW); Chih-Ming Fan, Taipei (TW); Chi-Wen Liu, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 254 days.

(21) Appl. No.: 12/853,276

(22) Filed: Aug. 9, 2010

(65) Prior Publication Data

US 2010/0300724 A1 Dec. 2, 2010

Related U.S. Application Data

(63) Continuation of application No. 11/984,477, filed on Nov. 19, 2007, now Pat. No. 7,795,534.

(51) Int. Cl.
  *H02G 3/14* (2006.01)
(52) U.S. Cl. ............. 174/67; 174/66; 439/135; 220/241
(58) Field of Classification Search .................... 174/66, 174/67; 220/241, 242; 439/135, 136, 142, 439/147
  See application file for complete search history.

(56) References Cited

U.S. PATENT DOCUMENTS

| | | | | |
|---|---|---|---|---|
| 5,240,426 A * | 8/1993 | Barla | ............................. | 439/136 |
| 5,477,010 A * | 12/1995 | Buckshaw et al. | ............... | 174/67 |
| 6,395,980 B2 * | 5/2002 | Iitsuka | ............................. | 174/50 |
| 6,797,884 B2 * | 9/2004 | Kubota | ............................. | 174/66 |
| 7,094,969 B1 * | 8/2006 | In | ..................................... | 174/66 |

FOREIGN PATENT DOCUMENTS

CN 2819669 Y 9/2006

* cited by examiner

*Primary Examiner* — Dhirubhai R Patel

(57) ABSTRACT

A sliding cover faceplate and an electronic device using the same are provided. The sliding cover faceplate includes a sliding cover, a cover plate, and a sliding structure. The cover plate is provided on the electronic device, and the sliding cover is disposed on one side of the cover plate. The sliding structure includes a guiding portion and an elastic positioning portion. The guiding portion is disposed on the cover plate and is connected to the sliding cover to guide the sliding cover to slide between a first location and a second location on the cover plate. The elastic positioning portion connects the cover plate with the sliding cover to provide an elastic force to the sliding cover, such that when the sliding cover slides close to the first location or the second location, the sliding cover is automatically positioned on the first location or the second location.

15 Claims, 4 Drawing Sheets

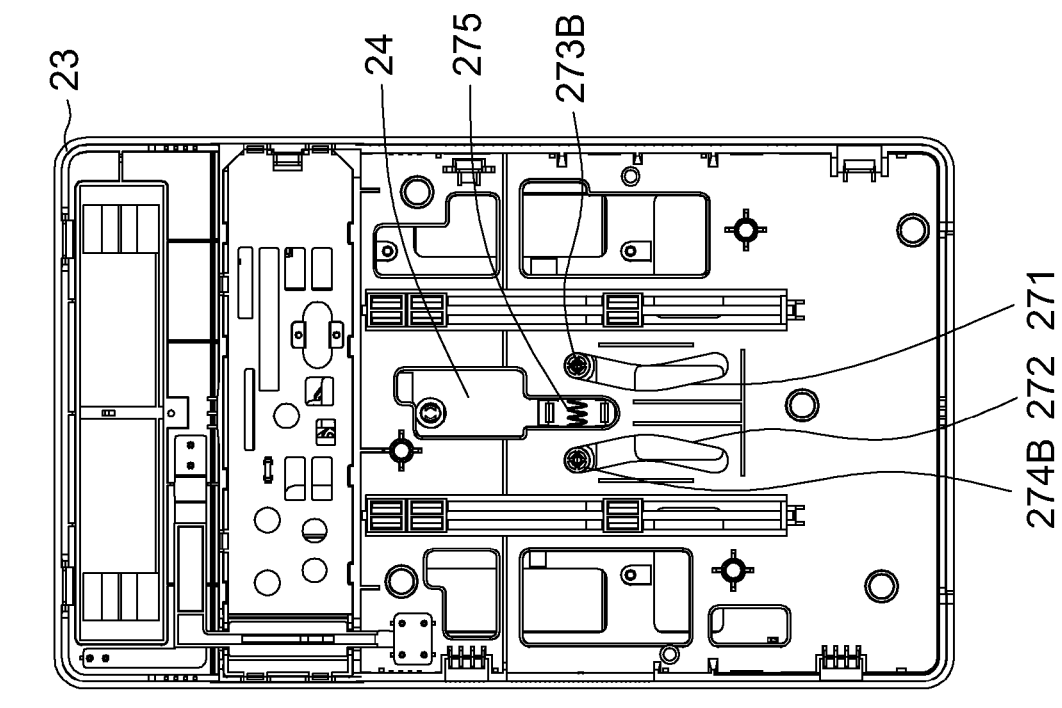
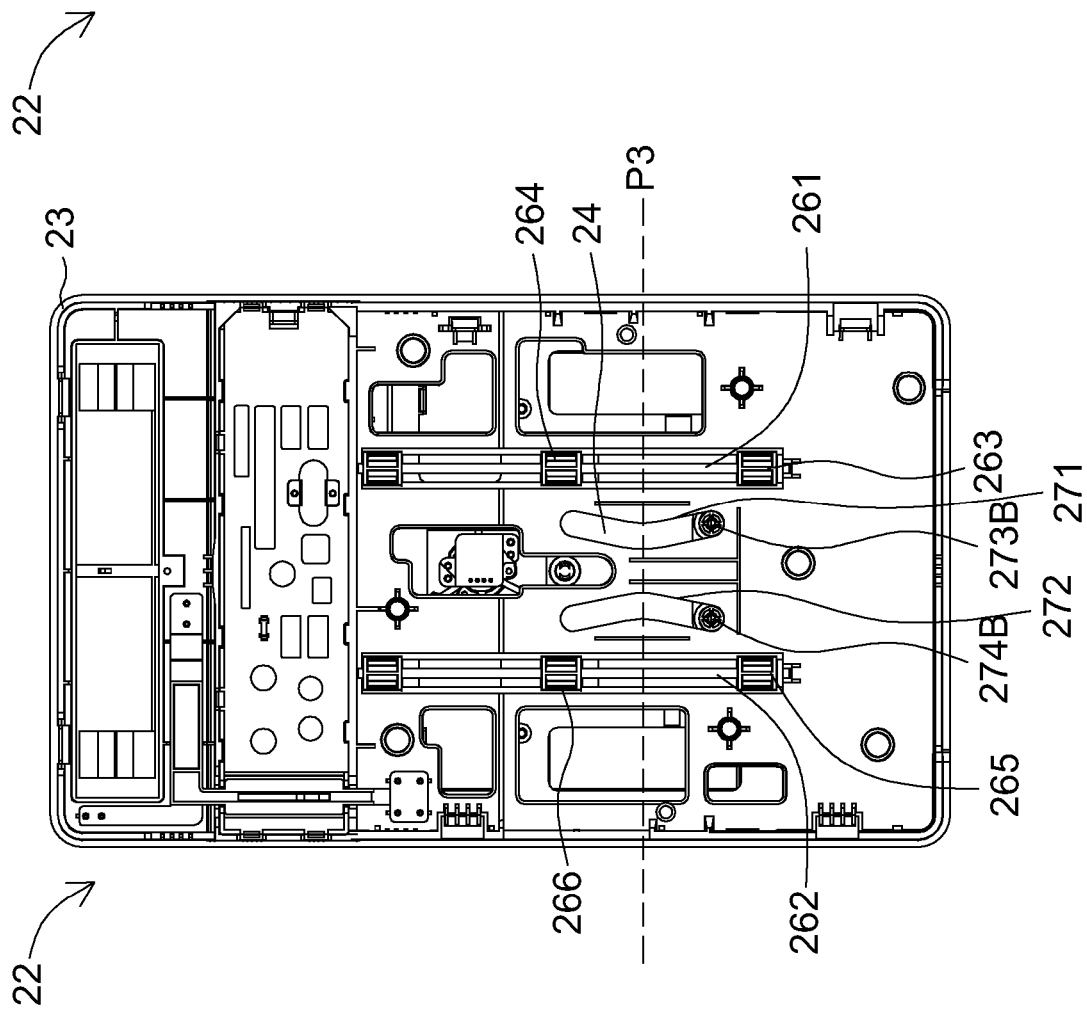

SLIDING COVER FACEPLATE AND ELECTRONIC DEVICE USING THE SAME

This application is a continuation application of application Ser. No. 11/984,477, filed on Nov. 19, 2007 now U.S. Pat. No. 7,795,534.

BACKGROUND OF THE INVENTION

1. Field of the Invention

The invention relates to a sliding cover faceplate and an electronic device using the same and, more particularly, to a sliding cover faceplate with a function of avoiding looseness or wear and tear and an electronic device using the same.

2. Description of the Related Art

With the popularization of personal computers, users no longer only pay close attention to the performance of computers, and their aesthetic requirements for external appearances of the computers become higher and higher. In the past, slots of the hardware connecting port interface of a computer, such as plug jacks of a loudspeaker, a microphone, an earphone or an externally connected device, are directly exposed outside the housing of the computer. At present, on the market, the faceplate of one type of computer host can completely hide the above slots, and the sliding cover on the faceplate needs to be withdrawn only when a user wants to use the slots on the interface.

Please refer to FIGS. 1A~1B which are schematic diagrams showing the action of a conventional sliding cover faceplate. As shown in FIGS. 1A~1B, a sliding cover faceplate 10 consists of a cover plate 11 and a sliding cover 12, and the cooperation between convex spots and concave spots is used to position the sliding cover 12 on the cover plate 11. In general, a plurality of convex portions 13 are symmetrically disposed at the cover plate 11, and a plurality of concave portions 14 are disposed at the sliding cover 12, and the cooperation of shapes of the convex portions 13 and the concave portions 14 is used to position. When the sliding cover 12 is at the bottom of the cover plate 11 and dose not slide, as shown in FIG. 1A, the sliding cover 12 is positioned on the cover plate 11 through, for example, four concave portions 14 coupled with four convex portions 13, and a slot 11A of the cover plate 11 is exposed. When a force is applied on the sliding cover 12 to make it move upward, the groove spots 14 and the convex portions 13 are separated. When the sliding cover 12 moves upward to a particular position, the topmost convex portions 13 of the cover plate 11 are embedded into the concave portions 14 to make the sliding cover 12 positioned at the topmost location. At this time, as shown in FIG. 1B, the sliding cover 12 hides the slot 11A.

However, to cooperate with the convex portions 13 of the cover plate 11, a moving over part 12A should be provided between the concave portions 14 of the sliding cover 12, which enable the sliding cover 12 to move without interfering with the convex portions 13. But the existence of the moving over part 12A causes the aperture between the sliding cover 12 and the cover plate 11 to be too great, and therefore, the sliding cover 12 shakes right and left during sliding. Further, during being embedded into or moved out of the concave portions 14, the convex portions 13 press against top and bottom sides of the concave portions 14, and after a plurality of operations, since the convex portions 13 and the concave portions 14 are all worn, the positioning effect of the sliding cover becomes bad.

BRIEF SUMMARY OF THE INVENTION

The invention provides a sliding cover faceplate and an electronic device using the same, and when the sliding cover faceplate is assembled at the electronic device, it can selectively expose slots of the electronic device. The cover plate and the sliding cover of the sliding cover faceplate are interconnected through a sliding structure which guides the sliding cover to linearly slide on the cover plate and also assists the sliding cover in sliding and positioning. As well as making the sliding cover move steadily, the design of the sliding rail of the sliding structure decreases the direct contact area between the sliding cover and the cover plate to decrease the friction force and the attrition between the sliding cover and the cover plate.

The invention provides a sliding cover faceplate applied to an electronic device, and the sliding cover faceplate includes a cover plate, a sliding cover and a sliding structure. The cover plate is disposed on the electronic device and the sliding cover is disposed at one side of the cover plate. The sliding structure includes a guiding portion and an elastic positioning portion. The guiding portion is disposed at the cover plate and is connected to the sliding cover to guide the sliding cover to slide between the first and second locations of the cover plate. The elastic positioning portion connects the cover plate with the sliding cover and provides an elastic force for the sliding cover to make the sliding cover automatically positioned at the first or second location when the sliding cover slides close to the first or second location of the cover plate.

The invention provides an electronic device which includes a body and a sliding cover faceplate. The body has a plurality of slots, and the sliding cover faceplate includes a cover plate, a sliding cover and a sliding structure. The cover plate is assembled on the body, and the sliding cover is provided at one side of the cover plate. The sliding structure includes a guiding portion and an elastic positioning portion. The guiding portion is disposed at the cover plate and connected to the sliding cover to guide the sliding cover to slide between the first location and the second location of the cover plate. The elastic positioning portion connects the cover plate with the sliding cover and provides an elastic force for the sliding cover to make the sliding cover automatically positioned at the first or second location to shade or expose the slots when the sliding cover slides close to the first or second location of the cover plate.

These and other features, aspects and advantages of the invention will become better understood with regard to the following description, appended claims, and the accompanying drawings.

BRIEF DESCRIPTION OF THE SEVERAL VIEWS OF THE DRAWINGS

FIG. 4A is a back view showing the sliding cover faceplate shown in FIG. 2 with the opened sliding cover.

FIG. 4B is a back view showing the sliding cover faceplate shown in FIG. 2 with the closed sliding cover.

DETAILED DESCRIPTION OF THE EMBODIMENTS

Figure 1:
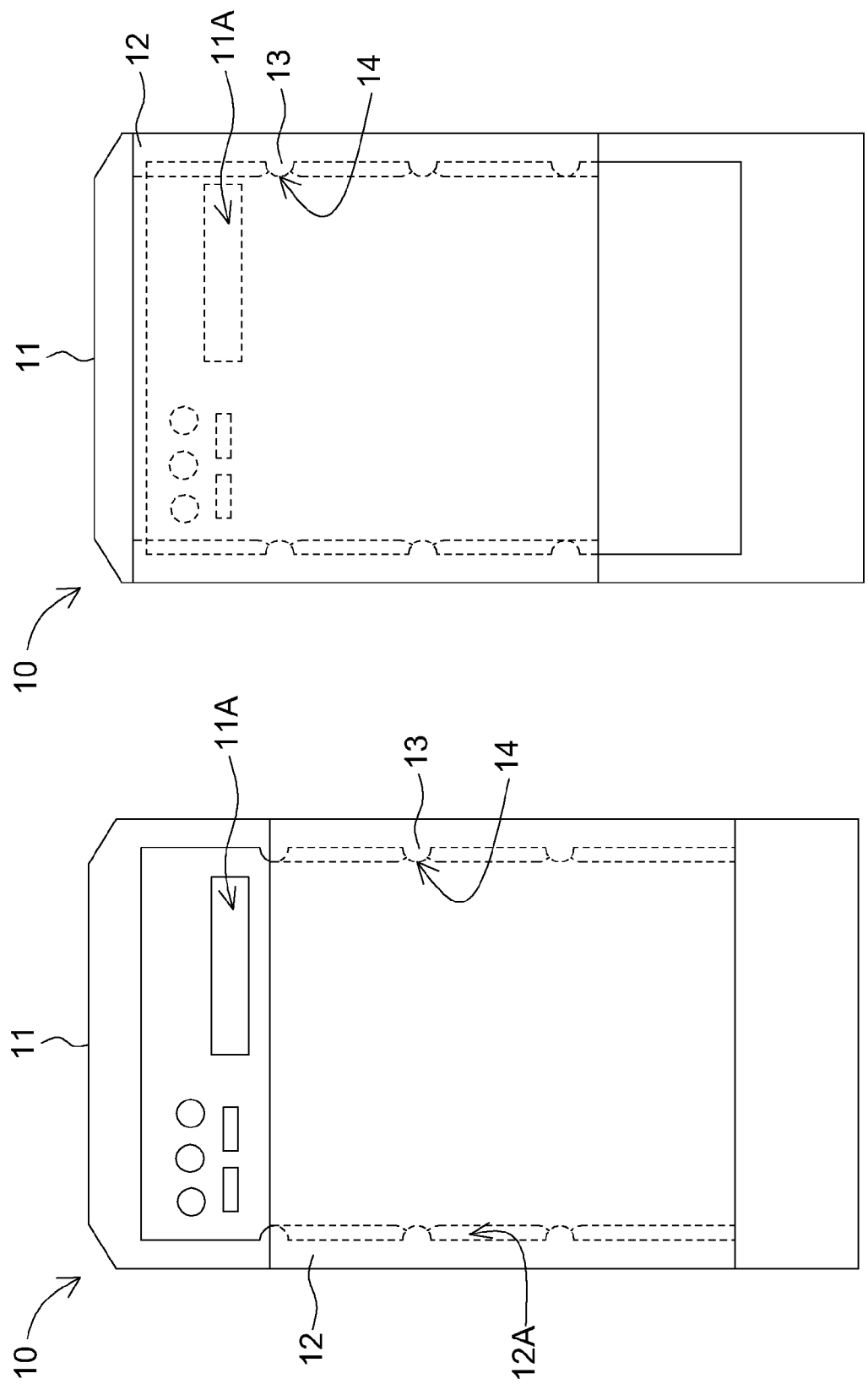
FIGS. 1A~1B are schematic diagrams showing the action of a conventional sliding cover faceplate.
Figure 2:
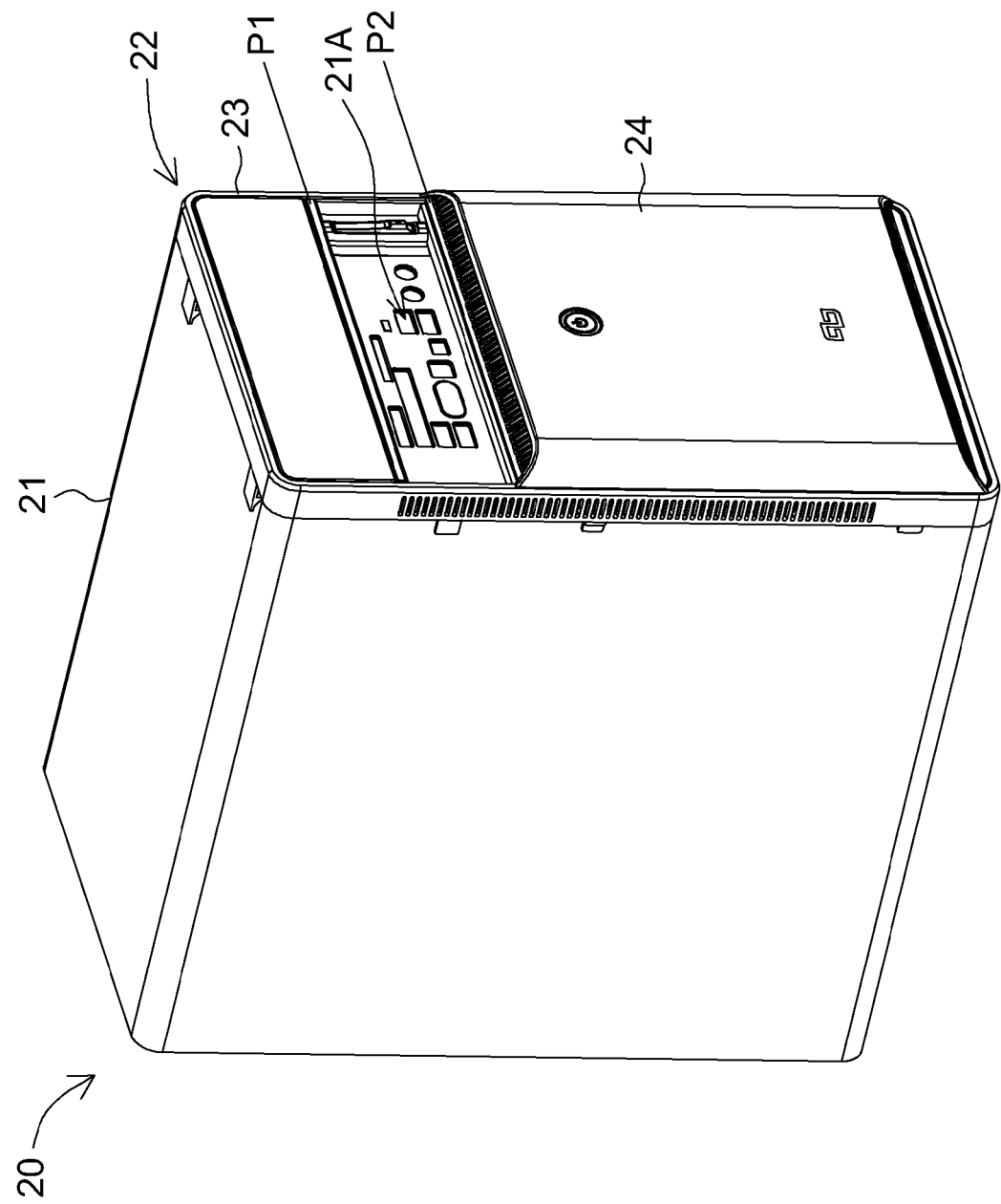
FIG. 2 is a schematic diagram showing a computer host according to a preferred embodiment of the invention.

The invention provides a sliding cover faceplate and an electronic device. The electronic device in the embodiment is a computer host which is taken for example. Please refer to FIG. 2, which is a schematic diagram showing a computer host according to a preferred embodiment of the invention. As shown in FIG. 2, the computer host 20 includes a body 21 and a sliding cover faceplate 22, and the sliding cover faceplate 22 is assembled on the body 21. The body 21 has a plurality of slots 21A, and the sliding cover faceplate 22 includes a cover plate 23, a sliding cover 24 and a sliding structure. The cover plate 23 is assembled on the body 21, the sliding cover 24 is provided at one side of the cover plate 23, and the sliding structure is disposed between the cover plate 23 and the sliding cover 24. The sliding structure (referring to FIG. 3) includes a guiding portion 26 and an elastic positioning portion 27. The guiding portion 26 is disposed on the cover plate 23 and connected to the sliding cover 24, and the guiding portion 26 guides the sliding cover 24 to slide between the first location P1 and the second location P2 of the cover plate 23. The elastic positioning portion 27 connects the cover plate with the sliding cover and provides an elastic force for the sliding cover 24 to make the sliding cover 24 automatically positioned at the first location P1 or the second location P2 to shade or expose the slots 21A of the body 21 when the sliding cover 24 slides close to the first or second location of the cover plate 23.

The first location P1 on the cover plate 23 is, for example, a fully closed location, and the second location P2 is, for example, a fully opened location. When the sliding cover 24 slides to the fully closed location, it shades the slots 21A on the body 21 to hide the slots 21A. In addition, when the sliding cover 24 slides from the fully closed location to the fully opened location, the slots 21A are exposed again. The slots 21A are, for example, plug jacks of the earphone, the loudspeaker, the microphone, universal serial bus (USB), or slots of various type of memory cards, etc. on the hardware connection interface of the computer host 20.

Figure 3:
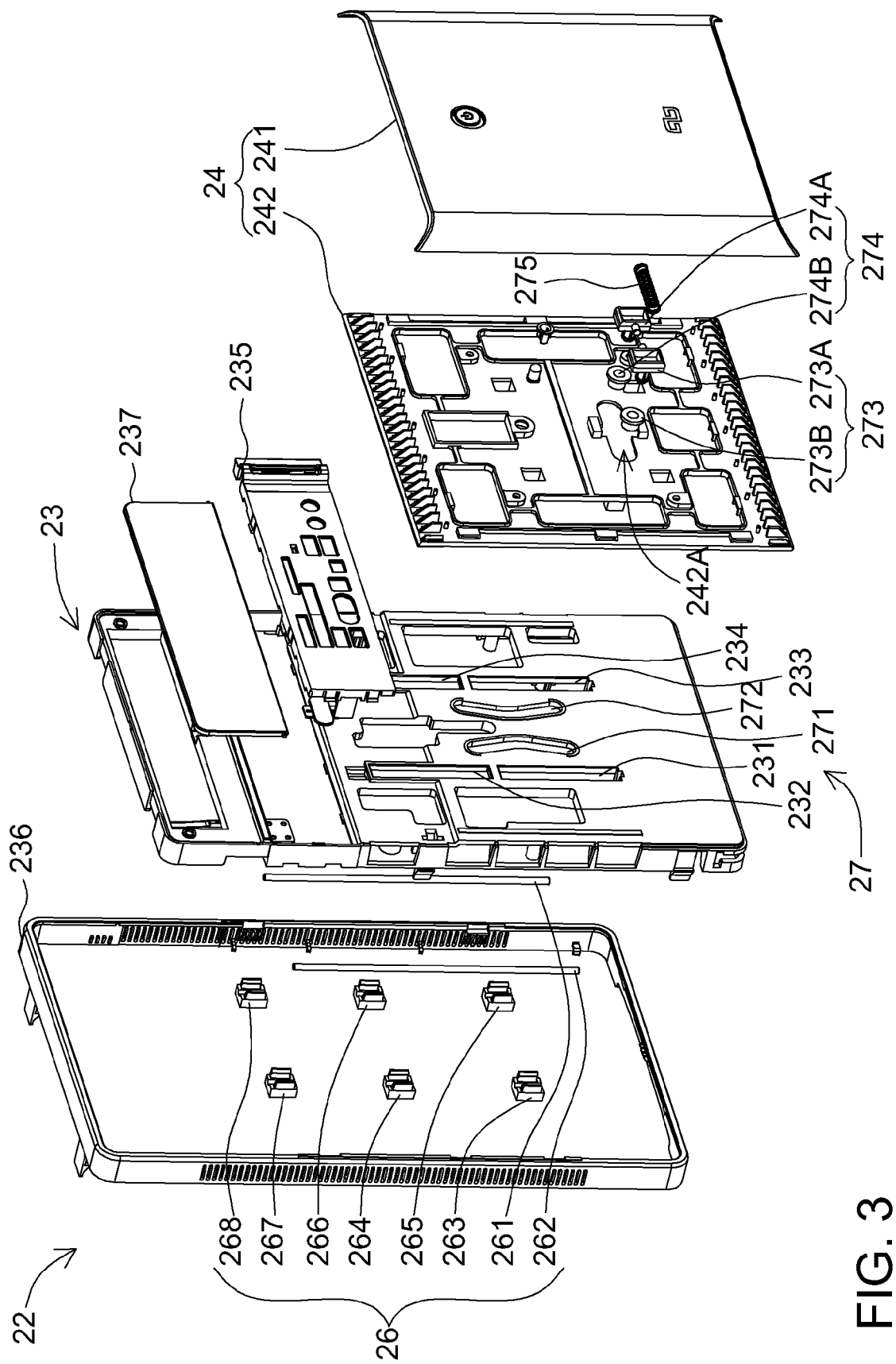
FIG. 3 is an exploded diagram of the sliding cover faceplate shown in FIG. 2.

The following illustrates each component of the sliding cover faceplate 22. Please refer to FIG. 3, which is an exploded diagram of the sliding cover faceplate shown in FIG. 2. As shown in FIG. 3, the guiding portion 26 includes at least one sliding rail. In a preferred embodiment, two sliding rails 261 and 262 are taken as an example, the two sliding rails 261 and 262 are parallel disposed on the cover plate 23, and the sliding cover 24 is coupled to the sliding rails 261 and 262. Wherein the sliding rail 261 is disposed at two grooves 231 and 232 of the cover plate 23, and the sliding rail 262 is disposed at two grooves 233 and 234. The guiding portion 26 is preferred to further include at least one sliding block. In the preferred embodiment, two sliding blocks are taken as an example, the two sliding blocks are disposed on the sliding cover 24 and coupled to the two sliding rails 261 and 262, respectively. The embodiment takes four sliding blocks as an example to illustrate. The four sliding blocks 263, 264, 265 and 266 are provided on the sliding rails 261 and 262 in pairs to increase the stability of the sliding cover 24 in sliding. In addition, the guiding portion 26 further includes two fasteners 267 and 268 for fixing one end of the two sliding rails 261 and 262 to the cover plate 23. The other end of the sliding rails 261 and 262 can be fixed by making the sliding rails 261 and 262 fastened into grooves 231 and 233. The sliding cover 24 consists of a first plate 241 and a second plate 252, and the second plate 242 is located between the first plate 241 and the cover plate 23.

The elastic positioning portion 27 includes two cambered sliding rails 271 and 272, two driven members 273 and 274, and an elastic component 275. The cambered sliding rails 271 and 272 such as two cambered sliding grooves are symmetrically disposed at the cover plate 23 and have a first positioning point and a second positioning point, respectively. The first positioning point and the second positioning point are, for example, located at two end points of the two cambered sliding grooves. The two driven members 273 and 274 are provided at the sliding cover 24 and coupled to the two cambered sliding rails 271 and 272, respectively. The sliding cover 24 can drive the two driven members to relatively slide at the two cambered sliding rails. The length of the cambered sliding rails 271 and 272 is the distance that the driven members 273 and 274 can slide, so that the location of the sliding cover 24 is restricted. The driven member 273 includes a guiding block 273A and a roller wheel 273B which are interconnected to each other, and the driven member 274 includes a guiding block 274A and a roller wheel 274B which are interconnected to each other. Wherein the guiding block 273A and 274A are provided between the first plate 241 and the second plate 242 of the sliding cover 24. The second plate 242 has an opening 242A, and the roller wheels 273B, 274B are preferred to pass through the opening 242A to be pivotally connected to the guiding blocks 273A, 274A, respectively. The elastic component 275 is, for example, a spring, and its two ends are connected to the guiding blocks 273A and 274A of the two driven members 273 and 274, respectively. The elastic component 275 can apply the elastic force to the guiding blocks 273A, 274A to assist the sliding cover 24 in sliding and positioning. When the sliding cover 24 slides close to the first location P1 or the second location P2 of the cover plate 23, the driven members can slide to the first positioning point or the second positioning point through the elastic force of the elastic component 275 to make the sliding cover automatically positioned at the first location P1 or the second location P2. To cooperate with other components of the sliding cover faceplate 22, the elastic positioning portion 27 is preferred to be located between the two sliding rails 261 and 262.

During the assembly of the sliding cover faceplate 22, the elastic positioning portion 27 is usually to be assembled to the sliding cover 24 first, and the sliding cover 24 is assembled to the sliding rails 261 and 262 which have been disposed at the cover plate 23. And then the fasteners 267 and 268 are assembled to the sliding rails 261 and 262 to fix the sliding rails 261 and 262 to the cover plate 23. Finally the sliding blocks 263, 264, 265 and 266 are assembled to the sliding rails 261 and 262 and combined with the second plate 242 of the sliding cover 24 to finish the assembly of the sliding cover faceplate 22. In addition, after the sliding cover 24 is assembled on the cover plate 23, the roller wheels 273B and 274B are assembled to the cambered sliding rails 271 and 272, respectively. Since the roller wheels 273B and 274B are pivotally connected to the guiding blocks 273A and 274A, and the roller wheels 273B and 274B can rotate, when the roller wheels 273B and 274B moves at the cambered sliding rails 271 and 272 and contacts the interior wall of the cambered sliding rails 271 and 272, the friction forces between the roller wheels 273B and 274B and the cambered sliding rails 271 and 272 are decreased to make the movement of the roller wheels 273B and 274B much smoother.

As shown in FIG. 3, an interface baffle 235 and a frame 236 are further disposed at the cover plate 23. Wherein the interface baffle 235 is used to shade the connecting port interface in the body 21, and the frame 236 is used to combine the whole sliding cover faceplate 22 with the body 21. Generally speaking, the computer host 20 can include, for example, an optical disk drive, a recording machine or other devices, and a pop-up baffle 237 can be further provided at the cover plate 23 to shade the above additional devices.

The following illustrates the slide of the sliding cover faceplate 22. Please refer to FIGS. 4A~4B. FIG. 4A is a back view showing the sliding cover faceplate shown in FIG. 2 with the opened sliding cover, and FIG. 4B is a back view showing the sliding cover faceplate shown in FIG. 2 with the closed sliding cover. When the sliding cover 24 is opened, as shown in FIG. 2, the sliding cover 24 is located at the second location P2 of the cover plate 23, and the back view of the sliding cover faceplate 22 is shown in FIG. 4A. The roller wheel 273B is located at the rockbottom portion of the cambered sliding rail 271, and the roller wheel 274B is located at the rockbottom portion of the cambered sliding rail 272. The guiding blocks 273A and 274A (as shown in FIG. 3) coupled to the roller wheels 273B and 274B are located in the sliding cover 24. The elastic force of the elastic component 275 (as shown in FIG. 4B) assembled on the guiding blocks 273A and 274A is applied to the guiding blocks 273A and 274A to make the roller wheels 273B and 274B hold the cover plate 23 from two sides of the cambered sliding rails 271 and 272. Shapes of the cambered sliding rails 271 and 272 are symmetrically bow-shaped, and there is a least interval at the central location P3 of the cambered sliding rails 271 and 272.

When a force is applied to the sliding cover 24 to make it move upward, the guiding blocks 273A and 274A (as shown in FIG. 3) in the sliding cover 24 guide the roller wheels 273B and 274B to slide along the cambered sliding rails 271 and 272. When the roller wheels 273B and 274B move to the central location P3, the elastic component 275 (as shown in FIG. 4B) has greatest amount of compression. Therefore, when the sliding cover 24 keeps moving, after the roller wheels 273B and 274B slide over the central location P3, and the elastic force of the elastic component 275 for the guiding blocks 273A, 274A can generate a pair of push forces outward via the design of the cambered sliding rails 271 and 272 to make the guiding blocks 273A and 274A and the roller wheels 273B and 274B semi-automatically slide upward along the cambered sliding rails 271 and 272 until they reaches top ends of the cambered sliding rails 271 and 272. As shown in FIG. 4B, at this time, the sliding cover 24 can be positioned at the first location P1 (shown in FIG. 2) of the cover plate 23.

In addition, as shown in FIGS. 4A~4B, the sliding rails 261 and 262 fixed to the cover plate 23 are located at two sides of the cambered sliding rails 271 and 272, and the sliding blocks 263, 264, 265 and 266 connected to the sliding rails 261, 262 are assembled on the sliding cover 24 to make the sliding cover 24 have much high stability during sliding. Simultaneously, the sliding cover 24 is connected to the cover plate 23 through the sliding rails 261 and 262 and the sliding blocks 263, 264, 265 and 266, and the contact area between them is small. Furthermore, since the sliding rails 261 and 262 are circular metal bars whose surfaces are smooth, and the sliding blocks 263, 264, 265 and 266 are plastic parts, the sliding performance between the sliding cover 24 and the cover plate 23 is preferred.

In other aspect, the sliding rails 261 and 262 are not limited to be disposed on the cover plate 23 and the sliding blocks 263, 264, 265 and 266 are also not limited to be disposed on the sliding cover 24. The sliding rails 261 and 262 can be disposed on the sliding cover 24, and the sliding blocks 263, 264, 265 and 266 can be disposed on the cover plate 23.

The sliding cover 24 is automatically positioned at the first location P1 or the second location P2 to shade or expose the slots when the sliding cover 24 slides close to the first location P1 or the second location P2 of the cover plate 23.

Certainly, although the embodiment takes the computer host 20 as an example, the sliding cover faceplate 22 of the invention also can be applied to the design of faceplates of other electronic devices, instruments, and so on, and the function of hiding the hardware connecting interface of devices is provided to beautify the external appearance of the computer host or other electronic devices. Compared with the sliding cover faceplate of a conventional computer host, the operation feeling of the sliding cover faceplate 22 of the invention is similar to the operation feeling of the sliding cover of a mobile phone. When a user pushes the sliding cover 24 to a certain location, the sliding cover 24 can semi-automatically slide to be positioned to open or close the hardware connecting interface, and the invention provides a convenient and laborsaving usage effect for the user. In addition, the sliding cover 24 does not directly slidingly contact with the cover plate 23, and then the friction force between them is reduced to avoid the attrition between the sliding cover 24 and the cover plate 23, and further to greatly increase the durability of the sliding cover faceplate 22.

For a sliding cover faceplate and an electronic device using the same disclosed in the embodiment of the invention, a guiding portion and an elastic positioning portion are provided on the sliding cover faceplate, and when a user wants to use the hardware connecting interface on the electronic device, he can open a sliding cover. The design of the guiding portion between the sliding cover and the cover plate makes the sliding cover steadily and smoothly slide. The design of the elastic positioning portion enables the sliding cover to slide and to be positioned in a certain length of travel, and makes the operation feeling of the sliding cover faceplate of an electronic device be similar to the operation feeling of the sliding cover of a mobile phone for a user. Since the sliding cover faceplate and the electronic device of the invention have high durability, they possess high market competition value.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A sliding cover faceplate used in an electronic device comprising:
   a frame;
   a cover plate provided at the electronic device;
   a sliding cover provided at one side of the cover plate; and
   a sliding structure comprising:
   a guiding portion disposed on the frame and connected to cover plate and connected to the sliding cover to guide the sliding cover to slide between a first location and a second location, wherein the guiding portion comprises a sliding rail and a sliding block, the sliding rail is provided between the cover plate and the sliding block, the sliding cover is coupled to the sliding rail, the sliding block is provided on the frame and coupled to the sliding cover, and the sliding block is coupled to the sliding rail; and
   an elastic positioning portion including an elastic component, the elastic positioning portion connecting the cover plate with the sliding cover, the elastic positioning portion providing an elastic force by the elastic positioning portion for the sliding cover to make the sliding cover automatically positioned at the first location or the second location when the sliding cover slides close to the first location or the second location of the cover plate.

2. The sliding cover faceplate according to claim 1, wherein the elastic positioning portion comprises:
   two cambered sliding rails symmetrically provided at the cover plate and having a first positioning point and a second positioning point, respectively; and two driven members provided at the sliding cover and coupled to the two cambered sliding rails, respectively, the sliding cover being capable of driving the two driven members to relatively slide at the two cambered sliding rails;

wherein the elastic component is connected to the two driven members to provide the elastic force for the two driven members, and the two driven members are capable of sliding to the first positioning point or the second positioning point through the elastic force of the elastic component to make the sliding cover automatically positioned at the first location or the second location when the sliding cover slides close to the first location or the second location of the cover plate.

3. The sliding cover faceplate according to claim 2, wherein each of the two driven members comprises a guiding block and a roller wheel, and the two roller wheels are connected to the two guiding blocks, respectively, and coupled to the two cambered sliding rails.

4. The sliding cover faceplate according to claim 3, wherein the lower surface of the sliding cover has an opening, and the two guiding blocks are provided in the sliding cover, and the two roller wheels pass through the opening and are pivotally connected to the two guiding blocks.

5. The sliding cover faceplate according to claim 4, wherein the sliding cover is composed of a first plate and a second plate, and the second plate which has the opening is located between the first plate and the cover plate, and the two guiding blocks are located between the first plate and the second plate.

6. The sliding cover faceplate according to claim 3, wherein two ends of the elastic component are connected to the two guiding blocks, respectively.

7. An electronic device comprising:
a frame;
a body having a plurality of slots; and
a sliding cover faceplate comprising a cover plate assembled on the body, a sliding cover provided at one side of the cover plate and a sliding structure, the sliding structure comprising:
a guiding portion disposed on the frame and connected to cover plate and connected to the sliding cover to guide the sliding cover to slide between a first location and a second location, wherein the guiding portion comprises a sliding rail and a sliding block, the sliding rail is provided between the cover plate and the sliding block, the sliding cover is coupled to the sliding rail, the sliding block is provided on the frame and coupled to the sliding cover, and the sliding block is coupled to the sliding rail; and
an elastic positioning portion including an elastic component, the elastic positioning portion connecting to the cover plate with the sliding cover, the elastic positioning portion providing an elastic force by the elastic component for the sliding cover to make the sliding cover automatically positioned at the first location or the second location to shade or expose the slots when the sliding cover slides close to the first location or the second location of the cover plate.

8. The electronic device according to claim 7, wherein the elastic positioning portion comprises:
two cambered sliding rails symmetrically provided at the cover plate and having a first positioning point and a second positioning point, respectively; and
two driven members provided at the sliding cover and coupled to the two cambered sliding rails, respectively, the sliding cover being capable of driving the two driven members to relatively slide at the two cambered sliding rails;

wherein the elastic component is connected to the two driven members to provide the elastic force for the two driven members, and the two driven members are capable of sliding to the first positioning point or the second positioning point through the elastic force of the elastic component to make the sliding cover automatically positioned at the first location or the second location when the sliding cover slides close to the first location or the second location of the cover plate.

9. The electronic device according to claim 8, wherein each of the two driven members comprises a guiding block and a roller wheel, and the two roller wheels are connected to the two guiding blocks, respectively and coupled to the two cambered sliding rails.

10. The electronic device according to claim 9, wherein the lower surface of the sliding cover has an opening, and the two guiding blocks are provided in the sliding cover, and the two roller wheels pass through the opening and are pivotally connected to the two guiding blocks.

11. The electronic device according to claim 10, wherein the sliding cover is composed of a first plate and a second plate, and the second plate which has the opening is located between the first plate and the cover plate, and the two guiding blocks are located between the first plate and the second plate.

12. The electronic device according to claim 9, wherein two ends of the elastic component are connected to the two guiding blocks, respectively.

13. The electronic device according to claim 8, wherein the elastic component is a spring.

14. The electronic device according to claim 8, wherein the electronic device is a computer host.

15. An electronic device comprising:
a frame;
a body having a plurality of slots; and
a sliding cover faceplate comprising a cover plate assembled on the body, a sliding cover provided at one side of the cover plate and a sliding structure, wherein the sliding cover comprising a sliding rail, and the sliding structure comprising:
a guiding portion disposed on the frame and connected to cover plate and connected to the sliding cover to guide the sliding cover to slide between a first location and a second location, wherein the guiding portion comprises a sliding block provided on the frame and coupled to the cover plate, and the sliding block is coupled to the sliding rail; and
an elastic positioning portion comprising an elastic component, the elastic positioning portion connecting the cover plate with the sliding cover, the elastic positioning portion providing an elastic force by the elastic component for the sliding cover to make the sliding cover automatically positioned at the first location or the second location to shade or expose the slots when the sliding cover slides close to the first location or the second location of the cover plate.

* * * * *